(12) United States Patent
Eppier et al.

(10) Patent No.: US 6,941,329 B2
(45) Date of Patent: Sep. 6, 2005

(54) DIGITAL METHOD FOR INCREASING THE CALCULATION ACCURACY IN NON-LINEAR FUNCTIONS AND HARDWARE ARCHITECTURE FOR CARRYING OUT SAID METHOD

(75) Inventors: Wolfgang Eppier, Karlsruhe (DE); Thomas Fischer, Dornstetten (DE)

(73) Assignee: Forschungszentrum Karlsruhe GmbH, Karlsruhe (DE)

( * ) Notice: Subject to any disclaimer, the term of this patent is extended or adjusted under 35 U.S.C. 154(b) by 759 days.

(21) Appl. No.: 09/902,855

(22) Filed: Jul. 12, 2001

(65) Prior Publication Data

US 2003/0208515 A1 Nov. 6, 2003

Related U.S. Application Data

(63) Continuation-in-part of application No. PCT/EP00/00920, filed on Feb. 5, 2000.

(30) Foreign Application Priority Data

Feb. 15, 1999 (DE) .......................... 199 06 559

(51) Int. Cl.[7] .......................... G06F 15/00; G06F 7/38
(52) U.S. Cl. .................................. 708/200; 708/552
(58) Field of Search ............................. 708/200, 204, 708/552

(56) References Cited

U.S. PATENT DOCUMENTS

| | | | | |
|---|---|---|---|---|
| 3,812,470 | A | * 5/1974 | Murtha et al. | 712/221 |
| 4,215,415 | A | * 7/1980 | Kanemasa et al. | 708/306 |
| 4,282,581 | A | * 8/1981 | Bondurant et al. | 708/530 |
| 2001/0025292 | A1 | * 9/2001 | Denk et al. | 708/550 |

FOREIGN PATENT DOCUMENTS

WO    WO 95/02861    1/1995

OTHER PUBLICATIONS

Fischer, "Optimierte Implementierung Neuronaler Strukturen in Hardware", Jan. 1999, Forschungszentrum Karlsruhe, Wissenschaftliche Berichte, FZKA 6251, pp. 70–75.

* cited by examiner

Primary Examiner—Tan V. Mai
(74) Attorney, Agent, or Firm—Klaus J. Bach

(57) ABSTRACT

In a digital electronic method for increasing the calculation accuracy in non-linear functions and a system for performing the method, wherein an input format has a strictly defined word but the fixed point may be at different locations, the values are so processed that the accuracy of the calculations and also the calculation speed are substantially increased.

5 Claims, 1 Drawing Sheet

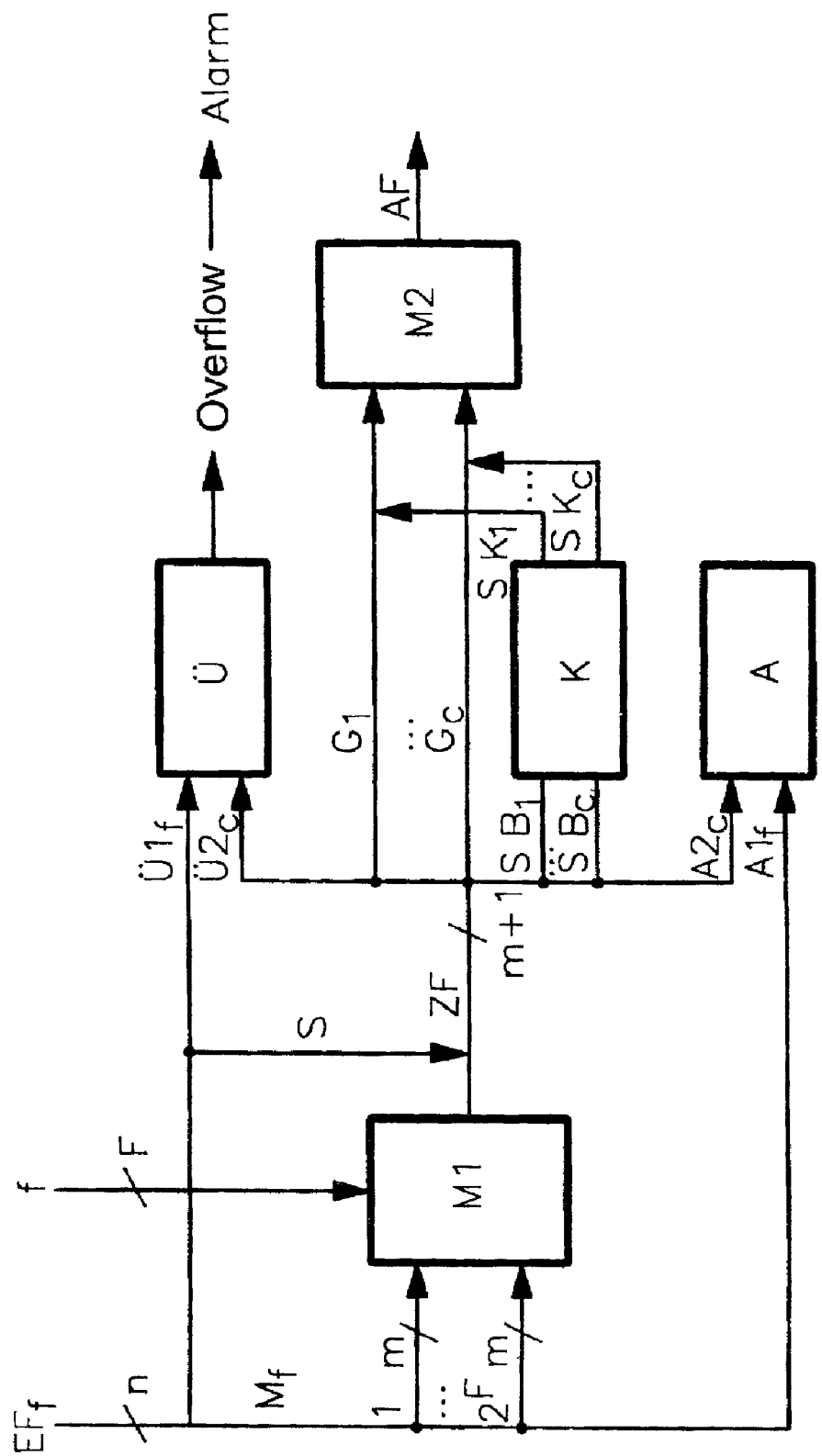

DIGITAL METHOD FOR INCREASING THE CALCULATION ACCURACY IN NON-LINEAR FUNCTIONS AND HARDWARE ARCHITECTURE FOR CARRYING OUT SAID METHOD

This is a Continuation-In-Part application of international application PCT/EP00/00920 filed Feb. 5, 2000 and claiming the priority of German application 199 06 559.4 filed Feb. 15, 1999.

BACKGROUND OF THE INVENTION

The invention resides in a method of operating an electronic system by which the calculation accuracy in non-linear functions is increased.

Algorithms requiring a large number of calculations as they are used particularly in the image and signal processing field are performed generally by a computer or often, in technical applications, by microprocessors or digital signal processors. However, the calculation periods of these processors is often very long so that it often makes sense to install into the computer particular hardware which increases the processing speed of computation-intensive algorithms. This means that a specific chip (often a customer-specific chip—ASIC) or a set of chips is included in an electronic card, which may be used in a personal computer for increasing the processing speed. In comparison with conventional data processor solutions mainly the data formats are different.

A number format with a fixed point representation as compared to a floating point representation has the advantage that it provides for a simple and fast calculation.

For that reason, most customized chips (ASIC) use this type of representation. The greatest disadvantage herein however resides in a reduced accuracy in comparison with floating point operation. For internal computation, therefore often a greater word width is used for the number representation, which however cannot be maintained for external connections since then the expenses for data storage become excessive (see The IEEE standard for binary floating point arithmetic, ANSI/IEEE Standard 754—1985). This floating point format is very general and, with regard to size and number of building components, is far less efficient to accommodate.

Possible codings for different positions of the point are described in the publication of the Research Center Karlsruhe, Wissenschaftliche Berichte, FZKA 6251, 1/99, Fischer; "Optimierte Implementierung neuronaler Strukturen in Hardware", pages 70–75; http:hik.www4.fzk.de/hbk/literatur/FZK-Berich-te/FZKA6251.1.pdf, "download" on 22.05.2000 XP002138370. As input word, a binary number in a fixed-point format with a plus or minus sign is converted in a suitable process into an output word, in which the position of the decimal point is coded in the word itself.

WO 95 02861 A1 discloses a data processing system with a limited look-up table for a function with non-uniform solution.

If a larger word width is used for the intermediate format than for the output format a conversion from the larger to the smaller format has to occur. This involves a loss of accuracy. To that end, generally so many bits of the longer word are cut-off until the content fits into the smaller word. If the high-value bits are shortened, provisions must be made for a corresponding overflow treatment; if the low value bits are excessively shortened, the accuracy suffers. If no consideration is given to the subsequent external processing of the data outside of the chip, there is generally no other method available for increasing the accuracy of the output data.

It is therefore the object of the invention to provide a method for operating an electronic system by which the computation accuracy of non-linear functions is increased and to provide an electronic system with which the method can be efficiently performed that is within an optimum of time.

SUMMARY OF THE INVENTION

In a digital electronic method for increasing the calculation accuracy in non-linear functions and a system for performing the method, wherein an input format has a strictly defined word but the fixed point may be at different locations, the values are so processed that the accuracy of the calculations and also the calculation speed are substantially increased.

For a general explanation, a special situation is shortly described, wherein the data are further processed externally in a module which uses a non-linear function. This applies for example to a look-up table which provides for each input value a respective function value. This case often occurs when complicated functions are to be calculated rapidly. An example is the calculation of a neural network, which is performed essentially by matrix multiplications and a subsequent non-linear transfer function. The matrix multiplication can be realized efficiently on an application-dedicated microchip. The non-linear function, for example, the tangens hyberbolicus, is represented by a look-up table. In such a situation, the accuracy at the output of the look-up table is of greatest importance. In the case of non-linear functions however, this accuracy is essentially lower than the accuracy of the data coming from the chip which data are already reduced in quantity.

This is demonstrated by a simple example:

Assume the table represents the square function $f(x)=x^2$. To facilitate the understanding, a decimal number representation is used in place of a binary representation. Of interest is the range in the interval [0,1]. The data coming from the chip have an accuracy of 0.1; the data from the table have the same accuracy. The table depicts all possible numbers of the format on f(x), that is the table includes 11 records. The three lowest values (0, 0.1, 0.2) are—calculated accurately—depicted as (0, 0.01, 0.04). However, since the number accuracy is only 0.1 all three values are transcribed as the new value 0. On the other hand, the values 0.9 are transcribed as 0.8 and 1 is transcribed as 1. The value 0.9 cannot exist in the transcription area. With the quantification, consequently a maximum error of 0.2 is generated which is caused, on one hand, by the limited word width of the data coming from the chip and, on the other hand, is magnified by the non-linear function of the look-up table. A correction can be obtained by a coding of the data, which is more suitable as input for the look-up table.

In accordance with the invention, the accurate input format has an exactly defined word width but the fixed point may be at different locations. Each particular position of the fixed point corresponds to a particular format. In a first step, a uniform format is formed from these different formats wherein the fixed point is disposed at a defined location. Since to this end, already several higher value bits can be cut off, on overflow can occur which must be handled. The establishment of the uniform format is achieved by a multiplexer, which receives as input the different formats and which provides the standard format as output. The different formats are numbered and are selected by a coded control input of the multiplexer.

In the second step, the total definition range is divided into several subranges of which each utilize a separate number representation. The further operation is based on a binary number representation which is interpreted as a full number so that 1 is the smallest difference between two different numbers. In this way, a division of the definition range into subranges is achieved wherein for "flat" function ranges, in which the first differentiation is much smaller than 1 (f'(x) <<1, for all x of the respective sub-range) a less accurate number representation is selected. The reason herefor is that the transcription area B of the function section is smaller than the definition range D and, as a result, not all the values from D can be depicted in B as different values. Consequently, the values in D can be depicted less accurately without resulting in a noticeable loss in accuracy in B. In ranges in which the first differentiation is much greater than 1 (f'(x)>>1) a procedure opposite to that given above has to be used in order to maintain the accuracy in the transcription area. Consequently, the numbers of the definition range must be more accurately represented.

Conventional number representation:
with $$S\,XX\ldots X\,.\,XX\ldots X$$
$$\longleftarrow\text{n bits}\longrightarrow$$

Therein S represents the + or − sign, X represents the locations before the point and x represents the locations after the point. The coded number representation is then:
With $$SK\ldots KX\ldots X\,.\,X\ldots X$$
$$\longleftarrow\text{n bits}\longrightarrow$$

K is herein the range coding. For the coded number representation, a range coding is needed which determines in which range the present number is disposed.

If there are C sub-ranges, then the length of the range coding is lb(C), wherein lb is a two-logarithm. For the remaining number representation n—lb(C) locations are still left, if n is the number of locations per word. The 1 is subtracted because of the sign S.

The range coding is performed by few logic members (AND, OR, NOT), the new number representation is established by simple cutting and assembling. The output from the coding block are as many busses as there are subranges. The word width corresponds to the width of the external number representation.

The overflow block consists of a simple logic which determines whether with a concrete number the cut locations are not 0. If this is the case, an overflow occurs. The output of the block is at first the pure, largest possible, number representation, which is not provided with a sign. Whether this number has a positive or negative sign is indicated by the sign bit S.

With the present invention:
the original format is present in a different but firmly determined fixed point formats,
the coded format depends on the non-linearities of the non-linear functions following the coding and is optimized for these functions;
the definition range of the following non-linear functions, if necessary, is divided into ranges of different sizes which are distinguished by different codings;
the electronic system can be realized on an electronic card by a customer-specific ship set.

With the method according to the invention, the following advantages can therefore be obtained:
The accuracy of the functions following the coding depends exclusively on the width of the data format used and not on the non-linearities of the functions
The system presented herein is very fast—with the present state of the art it can perform calculation within a tact cycle at 50 MHz—and can be realized with little hardware expenses since the coding does not require any calculations such as additions or multiplications, but consists of simple logic members and multiplexers.

The advantages of the increased accuracy become apparent with calculation-intensive algorithms. It is particularly advantageous for applications in the area of image processsing and signal recognition such as in diagnostic systems in the medical or microsystem operations.

Examples are the recognition of micro-calcifications in a woman's breast during prophylactic examinations (see W. Eppler, T. Fischer, H. Gemmeke, R. Stotzka, T. Köder, "Neural Chip SAND/1 for Real Time Pattern Recognition", IEEE Transactions on Nuclear Sciences, Vol. 45, No. 4, August 1998, pp 1819–1823) or the detection of cosmic radiation (see W. Eppler, T. Fischer, H. Gemmeke, A. Chilmgarion, A. Vardanyan, "Neural Chip SAND In Online Data Processing of Extensive Air Showers", Proceedings of $1^{st}$ Int. Conf. on Modern Trends in Computational Physics, Dubna, Russia, June 1998). In both cases, the computational capabilities of state of the art computers is insufficient. The calculation intensive algorithm is performed on an insert card of a PC, which operates with a fixed point arithmetic. At the same time, the results of the calculations must be very accurate. The digital-electronic procedure and the hardware architecture thereof are very suitable for performing the procedure.

The invention will be described below in greater detail on the basis of the accompanying drawing.

BRIEF DESCRIPTION OF THE DRAWING

The sole FIGURE is a block circuit representation of the format transformation.

DESCRIPTION OF A PREFERRED EMBODIMENT

A number x of the width n is represented in the input format $EF_f = S\,V_f\,N_f$ (sign, locations before the point, locations after the point). The numbers provided with a sign have the sign at the highest value location.

f is a binary coded control word of the length F, which indicates the number of the present data format.

$2^F$ input data formats can be defined. They are distinguished only by the position of the fixed point. Which control word corresponds to which fixed point position can be freely determined. In a first processing step, the bits (A1) with the lowest values, which later cannot be used, are cut off. The bits (U1) with the highest values which are very likely never set may also be cut out. In that case, however, for safety reasons, a check must be made and, if necessary, an overflow must be created.

The input format may then be expressed in another way:

$$EF_f = S\,Ul_f\,M_f\,Al_f$$

The width $M_f$ is always m.

The position of the fixed point depends on the selected input format $EF_f$. The intermediate format ZF has the fixed point at a certain position independently of the input format $EF_f$. For that purpose different ranges $M_f$ of $EF_f$ must be copied to the appropriate bit position in the intermediate format ZF. This occurs by the transformation:

$$M1: M_f \rightarrow M$$

which can be achieved in a technical system by a multiplexer or a comparable logic circuit. The multiplexer M1 has f inputs, each including m locations, that is the locations $(n-1-\ddot{u}1_f-m_1 \ldots, n-2-\ddot{U}1_f)$. They are transformed by the multiplexer to the intermediate format $$ZF=SM.$$

The number range, which is represented by the ZF format, can be divided into C intervals $I_c$ so that the intervals cover the complete number range of ZF. Overlaps and gaps are not allowed.

For a simple setup, exponents of two are used as the interval limits. In this way, it is determined with simple logic members, in which interval each number is located. Then for each number x represented in the ZF format the following applies:

$$X \in I_c$$

for exactly one index C.

The intermediate format ZF=SM with the width m+1 is larger than the output format. Therefore some higher value bits $\ddot{U}2$ are again discarded. It must be examined however, whether they should go into an overflow; and there are also some low value bits which are simply cutoff. For each internal $I_c$, the cuts are made at different positions. The intermediate format may therefore also defined as follows:

$$ZF=S\ddot{U}2_c\ B_c\ A2_c$$

The overflow block determines for the locations n–2 to n–1–$\ddot{u}1_f$ of the input format $EF_f$ and for the locations m–1 to m–$\ddot{u}2_c$ of the intermediate format whether a location is not 0. If this is the case, the overflow $\ddot{U}$ is set. For all input formats $EF_f$ and intermediate formats $ZF_c$, the following operation is performed in the overflow block:

Overflow flag=1, if x(i)=1 for any i of (n–1–$\ddot{u}1_f, \ldots$ n–2, m–$\ddot{U}2_c \ldots,$ m–1)

Overflow flag=0, otherwise.

Per format $EF_f$ and intermediate format $ZF_c$ a logic OR-member with $\ddot{U}1_f+\ddot{U}2_c$ inputs is required.

The output format AF as coding for a number x is composed as follows:

$$AF=S\ K_c\ G_c,$$

wherein S represents the sign, $K_c$ the range of the coding and $G_c$ a section of low value bits which may partially overlap with $K_c$. $G_c$ is so wide that all numbers of the interval $I_c$ can be formed with the desired accuracy. The interval size, that is the number of elements of the interval as a two exponent $2^d$, so that $G_c$ has the width d. The width of $K_c$ is obtained from the width of the output format AF, minus the sign bit and the width of $G_c$. The coding $K_c$ is first arbitrary, it depends however on the codings of the other intervals which must be exclusive of one another. All codings K together are at minimum that is there is no coding which does not correspond to any interval and there are no two codings representing the same interval. In both cases, the number format is badly utilized and the maximum obtainable accuracy is lowered.

The coding $K_c$ is established in the coding block from $B_c$. With a suitable division of the intervals an interrogation of only a few bits of $B_c$ is necessary which, interconnected by simple logic members, provide the bits of the new coding $K_c$. Subsequently, the sign S and the lower value bits $G_c$ are attached to the $K_c$. This is done generally separately for each interval $I_c$, since the individual pieces may have different sizes.

A transformation $$M2: K_c\ G_c \rightarrow KG$$

transforms these individual pieces to the standard format $$AF=S\ KG.$$

Also, for this transformation a multiplexer is used herein, that is M2.

If subsequently a non-linear function is applied to the numbers coded in this manner, care must be taken that the calculation of the function also occurs taking into consideration the interval division $I_c$. For each $I_c$, there is a different accuracy that is the distances of subsequent values of the definition range are the same within an interval but are generally different between the intervals. This has to be taken into consideration in particular if look-up tables are used.

What is claimed is:

1. A digital electronic method for increasing the calculation accuracy in non-linear functions, comprising the steps of:

inputting, for processing, into a first multiplexing device of an electronic data processing device with $2^F$=f inputs, each with m locations, a value of a generally non-linear function which is present as a number and which serves as an input word together with a respective coded control word $f$ having the input format $$EF_f=S\ \ddot{U}1_f M_f Al_f$$

with the point being at an undetermined location, wherein S represents the plus or minus sign, $\ddot{U}1_f$ the locations with the highest values are used only in case of overflow, $M_f$ the locations with the uniform width m and $Al_f$ the locations with the lowest value, which are not used, and the index "$f$" is the coded control word of the length F, transforming said value in the data processing device to an intermediate format $$ZF=s\ \ddot{U}2_c B_c A2_c$$

with (m+1) locations and a fixed point location, (fixed point representation) wherein the locations $\ddot{U}1_f$ and $\ddot{U}2_c$, that is the locations $2_c$ of the overflow block $\ddot{U}$, are checked in an overflow device for overflow and which, upon occurrence of a fixed location, are capable of generating an alarm, and wherein the lower value locations $Al_f$ and $A2_c$ are cut off in an electronic cut-off device (A), dividing the number range which is represented at the output of the first multiplex device by the intermediate format ZF into C intervals of partially different sizes which cover the whole number range of ZF without overlapping and without gaps, and dividing the intermediate format ZF into a range $K_c$ for coding and a range $G_c$ of low value locations.

2. A method according to claim 1, comprising the following additional steps: performing the coding $K_c$ in an electronic coding device (K) from a partial coding range $B_c$, attaching the lower value locations $G_c$ to the coding $SK_c$, and performing in a second multiplexing device (M2) with C inputs of the width of the output format AF electronically the transformation $K_c G_c \rightarrow KG$, whereby a uniform output formal AF=SK is provided.

3. A digital electronic system for increasing the calculation accuracy in non-linear functions, comprising:

- a first multiplexing device (M1) with $2^F$ inputs for inputting arbitrary input formats (which are numbered) with a certain word width m and having a fixed point at different locations,
- a further coded control input by way of which the numbered input formats $EF_f$ are addressed, an output with a uniform intermediate format ZF also of
- predetermined word width wherein the fixed point is only at a predetermined location,
- an overflow device (Ü) for receiving the highest value locations $Ü1_f$ of the input format $EF_f$ to which the higher value locations $Ü2_c$ of the intermediate word $ZF_m$ at the multiplexing device (M1) which must be checked for overflow are added and which are interrogated for locations different from zero in order to provide an alarm if set locations are found,
- a coding device K, in which a coding range $K_c$ is generated from the partial range $B_c$ to be coded of the intermediate format $ZF_m$,
- a cut-off device (A) in which the lowest value locations $A1_f$ and the low value locations $A2_c$ are eliminated from further processing, and
- a second multiplexing device M2 in which the coded range $SK_c$ which is provided with a sign and the attached uncoded range $G_c$ of the low value locations in the intermediate format ZF are transformed into a predetermined output format AF.

4. A digital electronic system according to claim 3, wherein said overflow device, said coding device and said cutoff device consist of logic components.

5. A digital electronic system according to claim 4, wherein said system includes one of a specific chip and a specific set of chips.

* * * * *